United States Patent
Miyamoto et al.

(10) Patent No.: US 9,317,918 B2
(45) Date of Patent: Apr. 19, 2016

(54) APPARATUS, METHOD, AND COMPUTER PROGRAM PRODUCT FOR MEDICAL DIAGNOSTIC IMAGING ASSISTANCE

(71) Applicant: Hitachi, Ltd., Chiyoda-ku, Tokyo (JP)

(72) Inventors: Atsushi Miyamoto, Kokubunji (JP); Junichi Miyakoshi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 204 days.

(21) Appl. No.: 13/752,434

(22) Filed: Jan. 29, 2013

(65) Prior Publication Data

US 2013/0243244 A1 Sep. 19, 2013

(30) Foreign Application Priority Data

Mar. 16, 2012 (JP) ................... 2012-060587

(51) Int. Cl.
*G06T 7/00* (2006.01)

(52) U.S. Cl.
CPC ..... *G06T 7/0014* (2013.01); *G06T 2207/10072* (2013.01); *G06T 2207/20076* (2013.01); *G06T 2207/20081* (2013.01); *G06T 2207/30004* (2013.01); *G06T 2207/30096* (2013.01)

(58) Field of Classification Search
None
See application file for complete search history.

(56) References Cited

U.S. PATENT DOCUMENTS

| | | | | |
|---|---|---|---|---|
| 6,757,415 | B1 * | 6/2004 | Rogers et al. | 382/130 |
| 2007/0036402 | A1 * | 2/2007 | Cahill et al. | 382/128 |
| 2008/0233576 | A1 * | 9/2008 | Weston et al. | 435/6 |
| 2010/0036782 | A1 | 2/2010 | Zhao et al. | |
| 2010/0266179 | A1 * | 10/2010 | Ramsay et al. | 382/131 |
| 2011/0142301 | A1 * | 6/2011 | Boroczky et al. | 382/128 |
| 2011/0172514 | A1 | 7/2011 | Lee et al. | |
| 2011/0274338 | A1 * | 11/2011 | Park et al. | 382/133 |
| 2012/0201445 | A1 * | 8/2012 | El-Baz | 382/133 |
| 2012/0316421 | A1 * | 12/2012 | Kumar et al. | 600/407 |

FOREIGN PATENT DOCUMENTS

| | | |
|---|---|---|
| JP | 2004-254742 A | 9/2004 |
| JP | 2006-43007 A | 2/2006 |
| JP | 2007-307358 A | 11/2007 |
| JP | 2008-11900 A | 1/2008 |
| JP | 2010-504578 A | 2/2010 |
| JP | 2010-86449 A | 4/2010 |
| WO | WO 2008/035276 A2 | 3/2008 |
| WO | WO 2010/050333 A1 | 5/2010 |

OTHER PUBLICATIONS

Japanese Office Action dated May 7, 2015 (Four (4) pages).

* cited by examiner

*Primary Examiner* — Jon Chang
(74) *Attorney, Agent, or Firm* — Crowell & Moring LLP

(57) ABSTRACT

An apparatus for medical diagnostic imaging assistance includes memory that stores first feature information representing the feature of a lesion mask or non-lesion mask, a sampling unit that acquires a plurality of samples by making sampling form the memory based on the first feature information, a machine-learning unit that generates a first discrimination condition corresponding to each of samples by carrying out a machine-learning step on the multiple samples, and a statistical processing unit that generates a second discrimination condition by carrying out a statistical processing step under the first discrimination condition, in which a detection function determines whether a lesion candidate mask is an actual lesion by referring to second feature information representing the feature of a lesion candidate mask under a second discrimination condition.

7 Claims, 9 Drawing Sheets

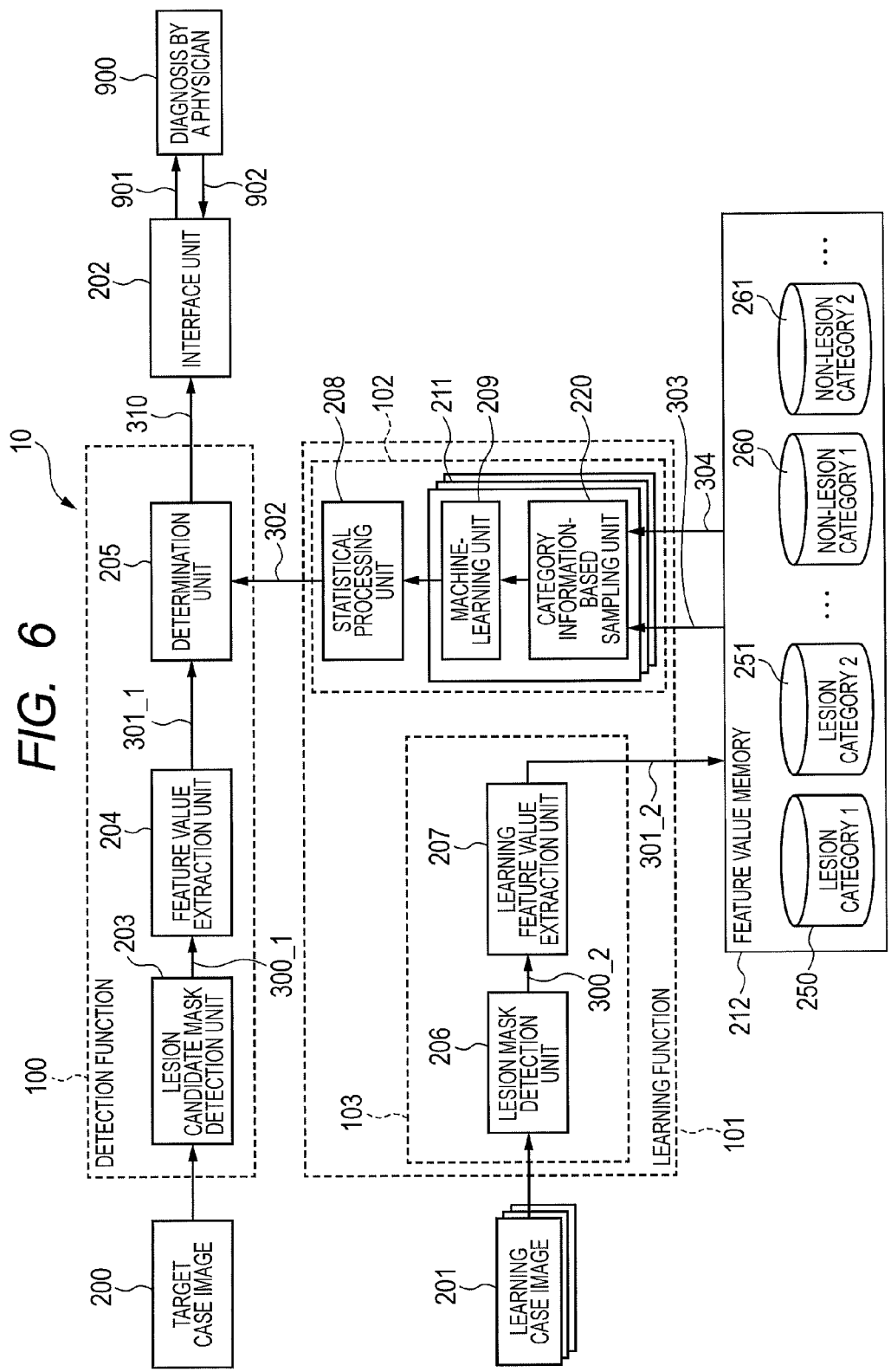

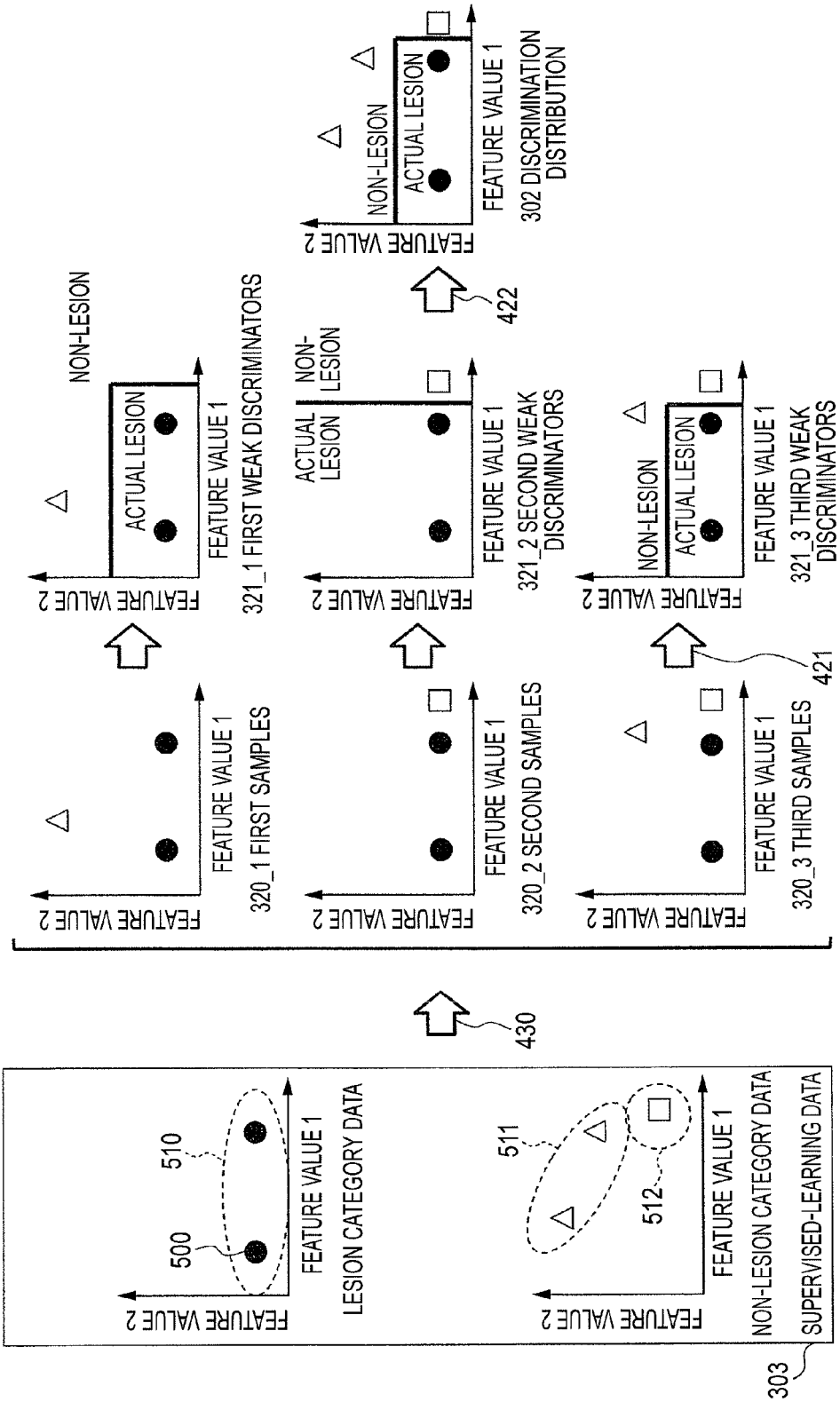

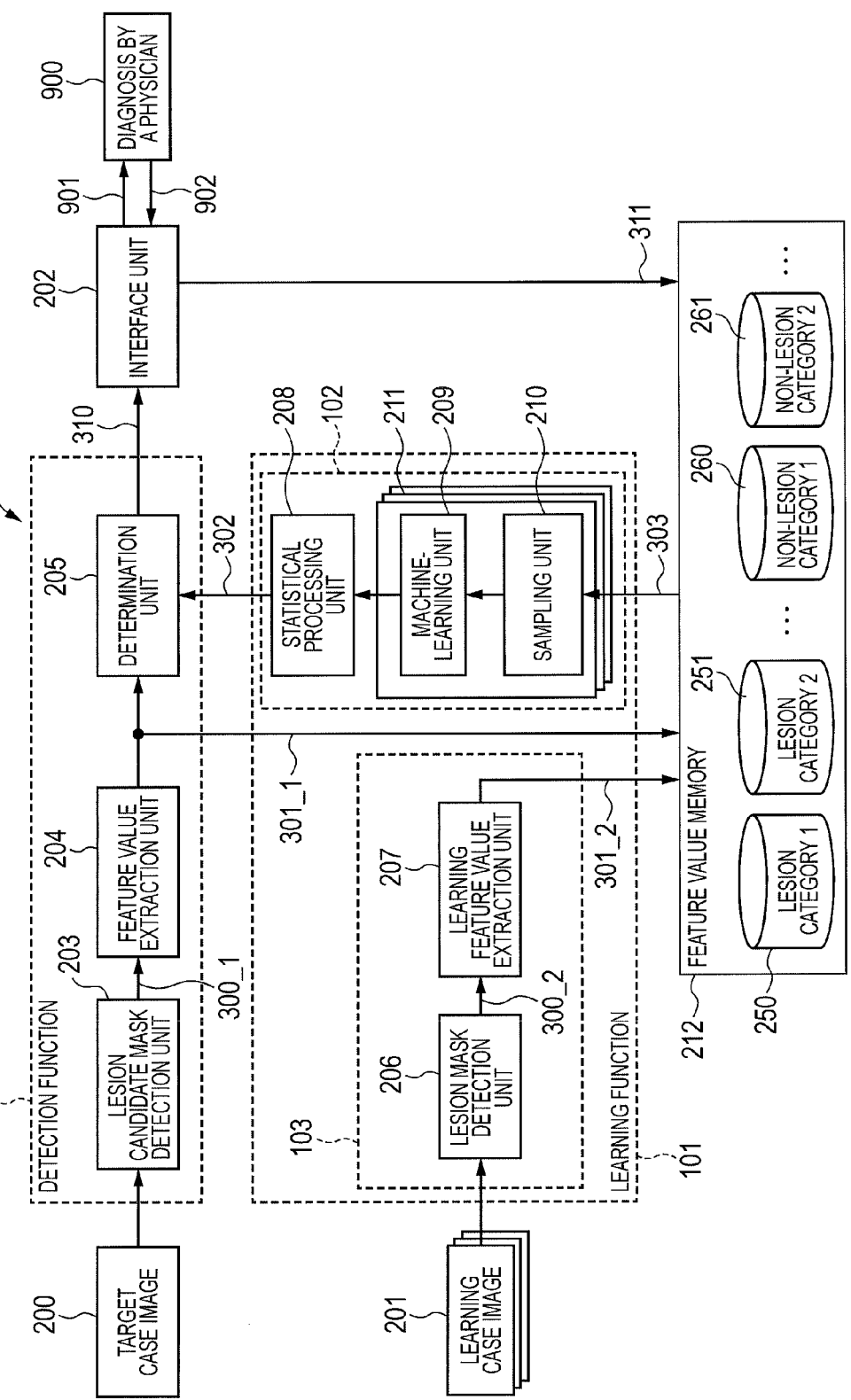

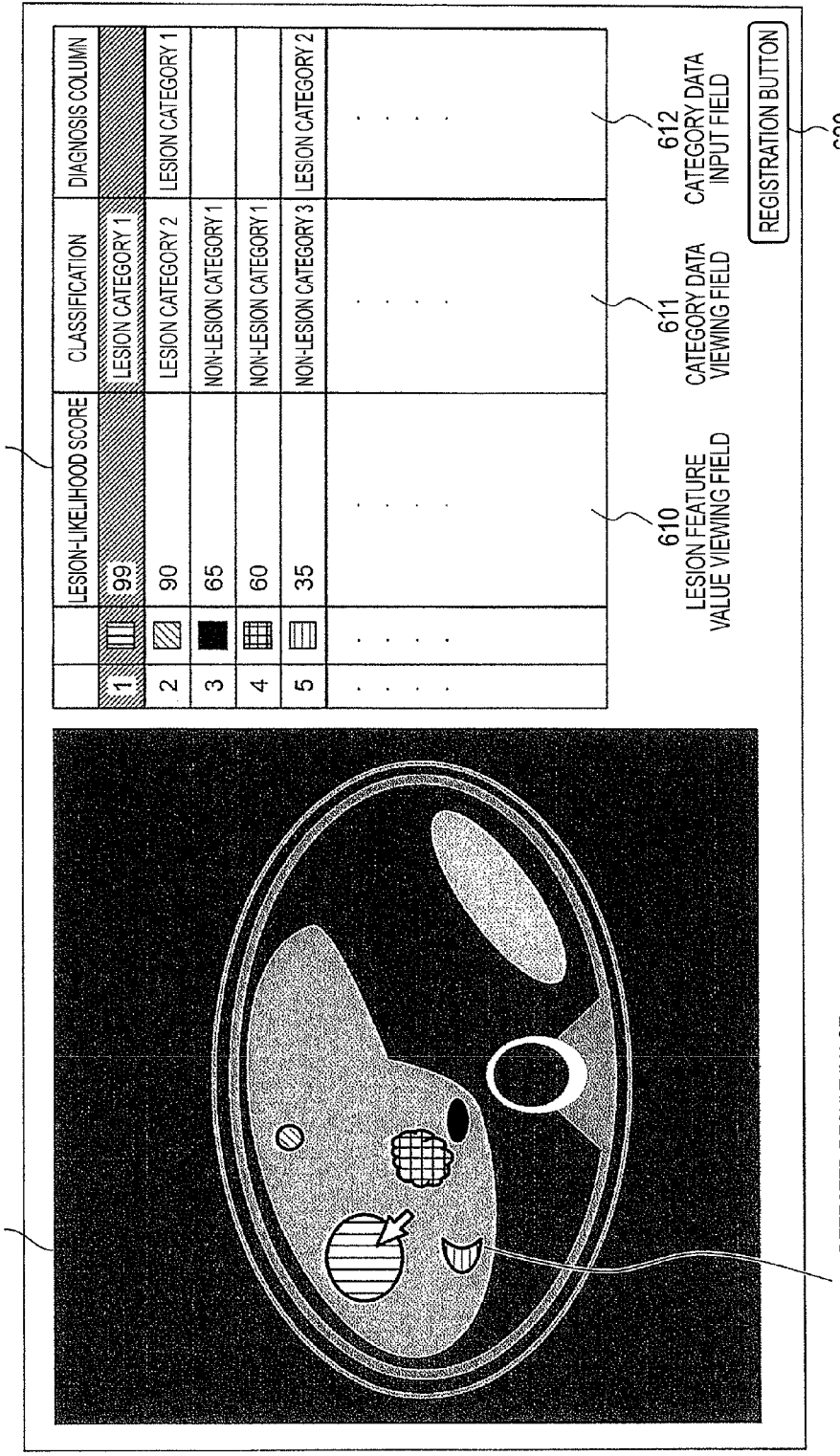

APPARATUS, METHOD, AND COMPUTER PROGRAM PRODUCT FOR MEDICAL DIAGNOSTIC IMAGING ASSISTANCE

CLAIM OF PRIORITY

The present application claims priority from Japanese patent application JP 2012-060587 filed on Mar. 16, 2012, the content of which is hereby incorporated by reference into this application.

FIELD OF THE INVENTION

The present invention relates to an apparatus for medical diagnostic imaging assistance capable of being used for assisting a radiologist to make decision on diagnosis and in more particular to an apparatus, a method, and a computer program product for automatically detecting a lesion on medical images, such as X-ray CT images and MRI images.

BACKGROUND OF THE INVENTION

In the medical field, with advance in diagnostic imaging apparatus, such as X-ray CT, MRI, PETX, and ultrasonic diagnostic imaging apparatus, and technologies thereof, early detection, preoperative planning, and therapeutic outcome evaluation of a malignant lesion has been efficiently performed.

On the other hand, factors, such as an increased high-resolution level and further finely-spliced images, require a diagnostician to treat a larger volume of image data, imposing a heavy burden on radiologists and clinicians. In recent years, to particularly reduce such a burden on radiologists and clinicians, the development of computer-aided diagnosis (CAD) apparatuses for assisting these diagnosticians to diagnose a lesion by digitizing a vast volume of medical image data has been advanced.

As for the aforementioned CAD apparatus, an apparatus for automatically detecting lesions, such as cancers, has been developed to minimize an oversight of any lesion on medical images by diagnosticians. Japanese Unexamined Patent Application Publication No. 2010-086449 discloses a lesion detection apparatus using a discriminator and a machine-learning method. The lesion detection apparatus disclosed in Japanese Unexamined Patent Application Publication No. 2010-086449, which has a control unit for generating the discriminator capable of determining the category (class) of input data, is characterized in that the control unit modifies the complexity of a probabilistic model for the discriminator, calculates the threshold for the information volume of the probabilistic model of interest, and uses a probabilistic model with minimum volume of information meeting the calculated threshold as the probabilistic model for the discriminator.

SUMMARY OF THE INVENTION

To generate a discriminator for determining lesions, etc., using the aforementioned machine-learning method, pre-classified supervised-learning data is used. In this case, the accuracy of determination by the aforementioned machine-learning method may be significantly improved by learning a given supervised-learning data and updating the discriminator used for determination. Thus, the accuracy of determination by the aforementioned machine learning-method is heavily dependent on the supervised-learning data.

Japanese Unexamined Patent Application Publication No. 2010-086449 discloses an apparatus for efficiently selecting the dimensionality of the probabilistic model (or discriminator) used for machine leaning. The apparatus disclosed in Japanese Unexamined Patent Application Publication No. 2010-086449, however, which has been developed to solve a problem that a difference in complexity of supervised-learning data may cause a variance in determination accuracy, assuming that a certain volume of supervised-learning data is obtained. For this reason, the apparatus disclosed in Japanese Unexamined Patent Application Publication No. 2010-086449 has a problem to be solved that if only an insufficient volume of supervised-learning data is available, the determination accuracy deteriorates. Giving an example, if only a small volume of supervised-learning data is available as master data, the discriminator may be ambiguously set under the condition that a lesion is definitely determined. In this case, an actual lesion with a feature value very close to a non-lesion is likely to be determined to be a non-lesion. Accordingly, if only a small volume of supervised-learning data is available, in particular, an appropriate boundary condition discriminating between an actual lesion and a non-lesion may not be set.

It is assumed that a sufficient volume of supervised-learning data is available in the today's medical practice. Giving an example, medical images, which are confidential information about patient's personal life, can not be easily acquired. Moreover, the types of the lesions, such as cancer, greatly vary and no medical images are acquired in some cases.

The objective of the present invention is to generate a high-accuracy discrimination condition (discriminator), improving the accuracy of lesion determination even if only a small volume of supervised-learning data is available.

To address the aforementioned problem, in one typical aspect of the present invention, a plurality of samples are acquired by making sampling from a memory unit for storing supervised-learning data, and the plurality of samples are processed at a machine-learning unit to generate a first discrimination condition. In this case, a statistical processing step is carried out under the first discrimination condition to generate a second discrimination condition, under which it is determined whether a lesion candidate mask is an actual lesion.

Specifically, the present invention provides an apparatus for medical diagnostic imaging assistance having a detection function for automatically detecting any lesion on a target case image and the apparatus includes: a memory unit that stores first feature information representing a lesion mask or non-lesion mask; a sampling unit that acquires a plurality of samples by making sampling based on the first feature information from the memory unit; a machine-learning unit that generates a first discrimination condition for each of the plurality of samples by processing machine-learning data on these samples; a statistical processing unit that generates a discrimination condition by carrying out a statistical processing step under the first discrimination condition; a first detection unit, in which the detection function detects a lesion candidate mask on the target case image; a first extraction unit that extracts second feature information representing the feature of a lesion candidate mask; and a determination unit that determines whether the lesion candidate mask is an actual lesion.

The present invention enables high-accuracy discrimination conditions to be generated, improving the determination of lesions even if only a small volume of supervised-learning data is available.

The present invention provides further advantages as known from the descriptions and accompanying drawings used herein. The problems to be addressed, composition and effectiveness of the apparatus, method, and computer program thereof according to a typical aspect of the present invention will be well understood by referring to the descriptions of the aspects of the present invention.

BRIEF DESCRIPTION OF THE INVENTION

FIG. 6 is a block diagram of the apparatus for medical diagnostic imaging assistance according to another aspect of the present invention;

FIG. 7 is a flow diagram illustrating a step of performing a discrimination distribution generation function according to another aspect of the present invention;

FIG. 8 is a block diagram of the apparatus for medical diagnostic imaging assistance according to a further aspect of the present invention; and FIG. 9 is a screen viewed through an interface unit according to the further aspect of the present invention.

DETAILED DESCRIPTION OF THE PREFERRED EMBODIMENT

Figure 1:
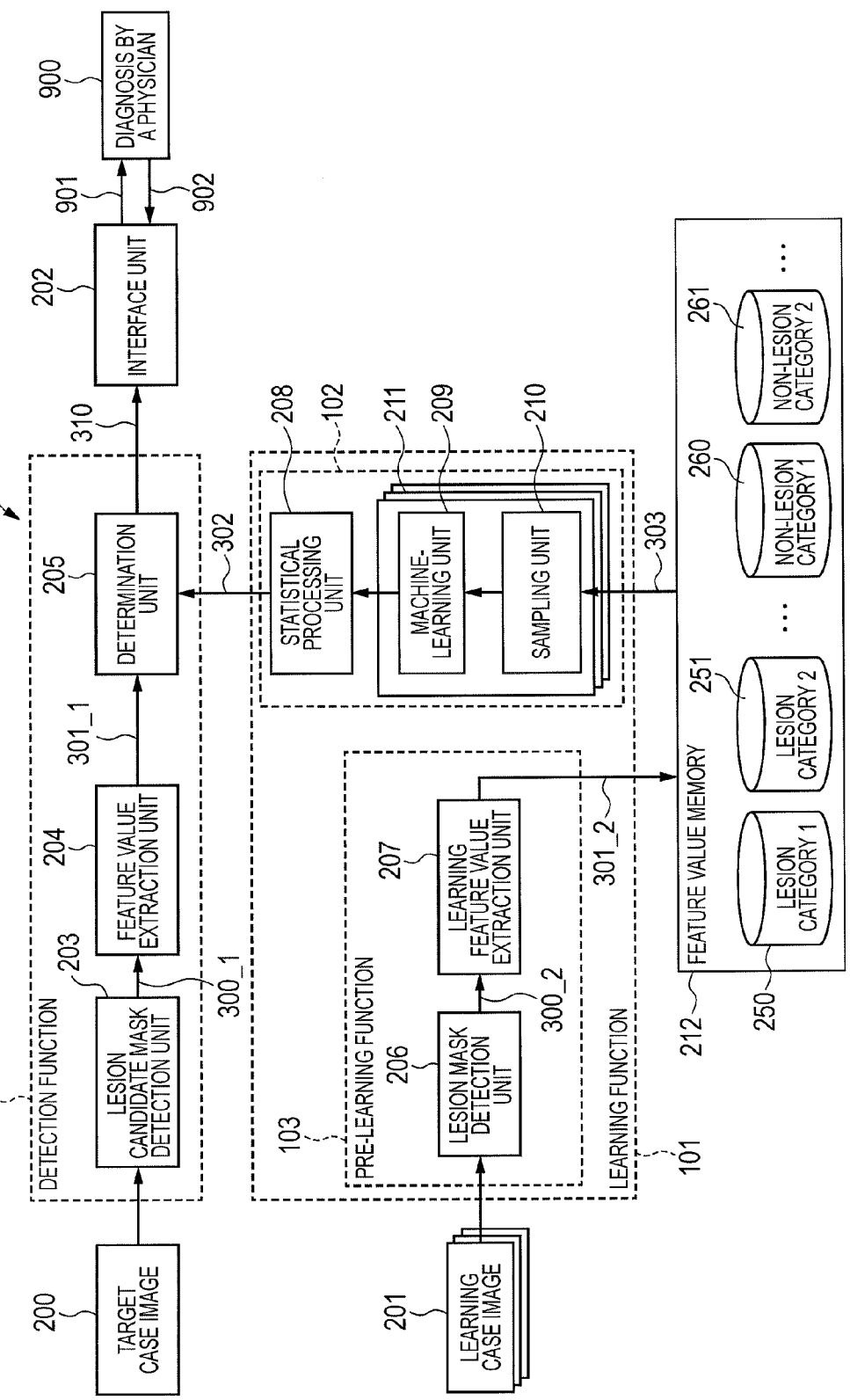
FIG. 1 is a block diagram of an apparatus for medical diagnostic imaging assistance according to one aspect of the present invention.

Hereinafter, the preferred embodiments of the present invention will be described in detail by referring to accompanying drawings. However, the same referential numerals are used for the same functional elements in the drawings to avoid redundant description. The drawings illustrate the preferred embodiments and implementations according to the principle of the prevent invention for the purpose of illustrations only, not intended to limit the scope of the invention.

First Embodiment

Hereinafter, an apparatus for medical diagnostic imaging assistance according to a first embodiment of the present invention will be described. FIG. 1 is a block diagram of an apparatus for medical diagnostic imaging assistance according to the first embodiment of the present invention.

<Overall Structure of the Apparatus for Medical Diagnostic Imaging Assistance>

An apparatus for medical diagnostic imaging assistance 10 according to the first embodiment of the present invention automatically detects a lesion, if any, on a target case image 200. The apparatus for medical diagnostic imaging assistance 10 has a detection function 100, a learning function 101, feature value memory 212, and an interface 202.

In the apparatus for medical diagnostic imaging assistance 10, the detection function 100 detects the lesion on the input target case image 200, and the interface 202 views a detection result 310 from the detection function 100 to a diagnostician (for example, a physician) in a viewing step 901. The physician makes a diagnosis 900 based on the detection result 310 viewed in a detection result viewing step 901. In this case, a learning function 101 generates a discrimination distribution (a second discrimination condition) 302 using data stored in feature value memory 212 such that the detection function 100 can detect a lesion, and inputs the discrimination distribution 302 in the detection function 100.

Hereinafter, the detection function and learning function 101 will be described in detail.

<Principle of the Detection Function 100>

The detection function 100 has a lesion candidate mask detection unit (a first detection unit) 203, a feature value extraction unit 204, and a determination unit 205. The lesion candidate mask detection unit 203 detects a lesion candidate mask 300_1 on a target case image (medical image) 200 input in the detection unit 100. The lesion candidate mask detection unit 203 inputs one or more lesion candidate masks 300_1 containing lesion candidate information in a feature value extraction unit 204. In this case, to detect the lesion candidate mask 300_1, any of image segmentation techniques, such as level setting, may be used.

The feature value extraction unit 204 extracts (calculates) a feature value vector (second feature information) 3011 corresponding to the lesion candidate mask 300_1 and inputs the calculated feature value vector 301_1 in the determination unit 205. The term "feature value" as used herein means geometric image information representing the feature of the lesion candidate mask 3001. The feature value includes the volume, surface area, sphericity, mean curvature, and Gauss curvature of the lesion candidate mask 300_1, texture information, such as a Haar-Like feature, and image luminance/contrast information.

The determination unit 205 determines whether the feature value vector 301_1 the lesion candidate mask 300_1 is an actual lesion by referring to a discrimination distribution 302 input from the learning function 101. The determination unit 205 outputs the obtained result as a determination result 310 to an interface unit 202.

Figure 2:
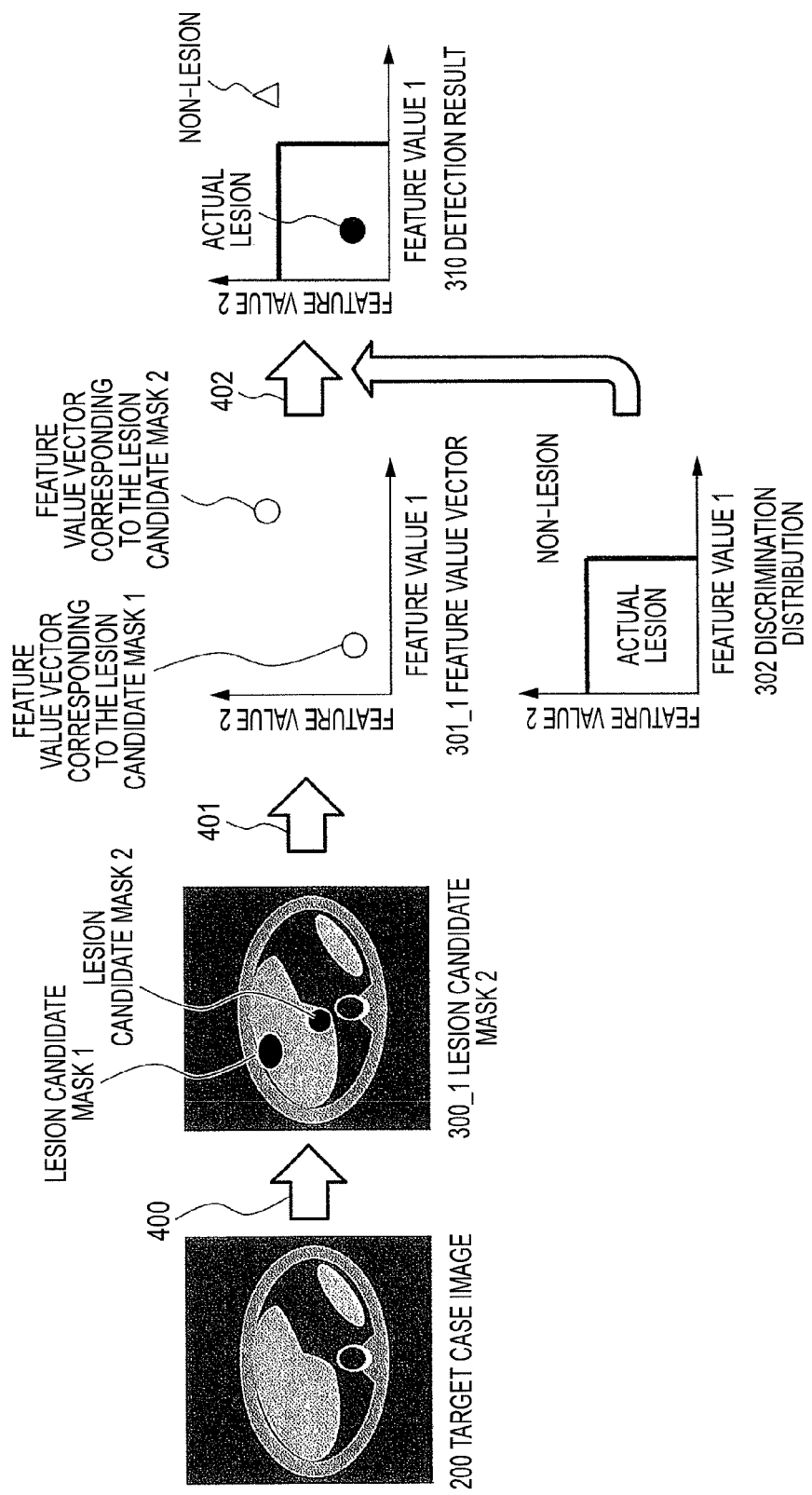
FIG. 2 is a flow diagram illustrating a step of performing a detection function according to one aspect of the present invention.

FIG. 2 is a flow diagram illustrating a step of performing the detection function 100. The same referential numerals as those in FIG. 1 are used for the same functional elements in FIG. 2.

A lesion candidate mask detection step 400 is carried out in the lesion candidate mask detection unit 203. A feature value extraction step 401 is carried out in the feature value extraction unit 204 and a determination step 402 is carried out in the determination unit 205.

As shown in FIG. 2, first, the lesion candidate mask detection step 400 is carried out on the input target case image 200 to detect the lesion candidate mask 300_1. In FIG. 2, two candidate masks, for example, one being a lesion candidate mask 1 and another being a lesion candidate mask 2, are detected.

Then, a feature value extraction step 401 is carried out on these two candidate masks to calculate the feature value vector 301_1 corresponding to each of the lesion candidate mask 1 and the lesion candidate mask 2. In this case, as an example, 2-dimensional feature value vector 301_1 is calculated using the feature value 1 and the feature value 2 as an axis. It should be noted that the feature value vector is not limited to a 2-dimensional vector. As aforementioned, the dimensionality of the feature value vector increases depending on the number of feature values, which are variable, to be used.

Finally, a determination step 402 is carried out on the calculated feature value vector 301_1. In this case, it is determined whether each feature value vector 301_1 is an actual lesion by referring to a discrimination distribution 302 to output the detection result 310. Since the feature value vector 301_1 corresponding to the lesion candidate mask 1 lies within the range of a lesion in the discrimination distribution 302, the lesion candidate mask 1 is determined to be an actual lesion. In contrast, since the feature value vector 301_1 corresponding to the lesion candidate mask 2 lies within the range of a non-lesion in the discrimination distribution 302, the lesion candidate mask 2 is determined to be a non-lesion.

<Principle of the Learning Function 101>

The learning function 101 has a discrimination distribution generation function 102 and a pre-learning function 103. Hereinafter, each of the functions will be described in detail.

The pre-learning function 103 has a lesion mask detection unit (second detection unit) 206 and a learning feature value extraction unit (second extraction unit) 207. The lesion mask detection unit 206 detects a lesion/non-lesion mask 300_2 on a learning case image 201 input in the pre-learning function 103. In this case, the lesion/non-lesion mask 300_2 is a mask related to an actual lesion or non-lesion. The learning case image 201 is an image, on which each of masks have been already determined to be an actual lesion or non-lesion.

The learning feature value extraction unit 207 extracts (calculates) a feature value vector 301_2 from a lesion/non-lesion mask 300_2 and stores the extracted feature value vector 301_2 in the feature value memory 212. In this case, the feature values, which are elements of the feature value vector, are the same values as those used in the detection function 100. Classification information related to a medical classification or a statistical classification has been added to the feature value vector 301_2 stored in the feature value memory 212. The medical and statistical classifications will be described later in detail. In FIG. 1, the feature value 301-2 is classified in a lesion category 1 (250), a lesion category 2 (251), a non-lesion category 1 (260), or a non-lesion category 2 (261) in the feature value memory 212.

Figure 3:
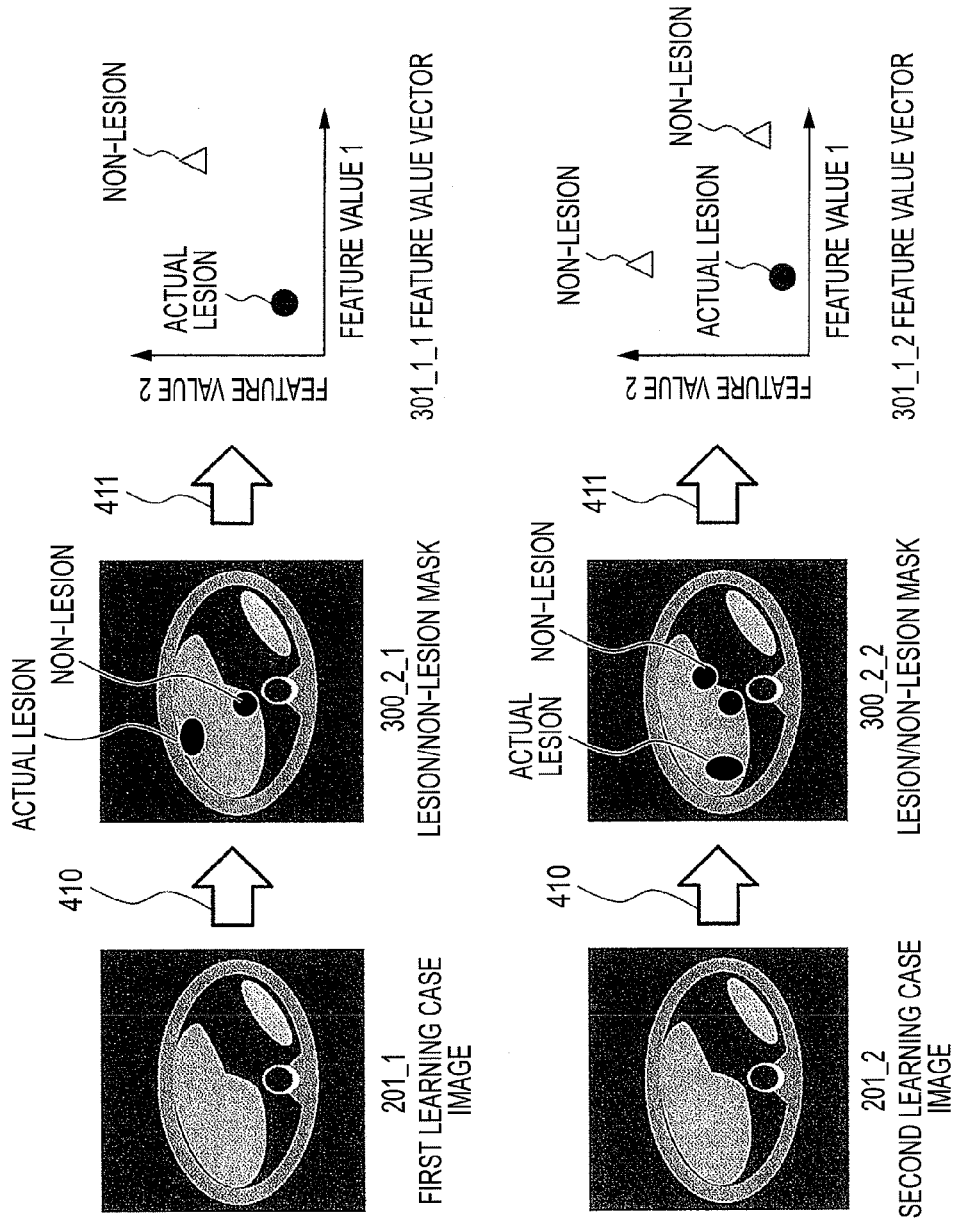
FIG. 3 is a flow diagram illustrating a step of performing a learning function according to one aspect of the present invention.

FIG. 3 is a flow diagram illustrating a step of performing the pre-learning function 103. A lesion mask detection step 410 is carries out in the lesion mask detection unit 206. A feature value extraction step 411 is carried out in the learning feature value extraction unit 207.

As shown in FIG. 3, the lesion mask detection step 401 is carried out on the input first learning case image 201_1 to detect the lesion/non-lesion mask 300_2_1. In this feature, two masks, for example, one being the lesion mask and another being the non-lesion mask are detected. In this case, the lesion is exemplified by hepatic tumor and the non-lesion is exemplified by a vein or portal vein.

Then, the feature value extraction step 411 is carried out on these two masks to extract the feature value vector 301_1_1 corresponding to each of the lesion and the non-lesion. The same step is carried out on the second learning case image 201_2. The processing of the second learning case image 201_1_1 results in the extraction of the feature value vector 301_1_2. The feature value vector 301_1_2 contains the feature value vector corresponding to one lesion and the feature value vector corresponding to two non-lesions.

Figure 4:
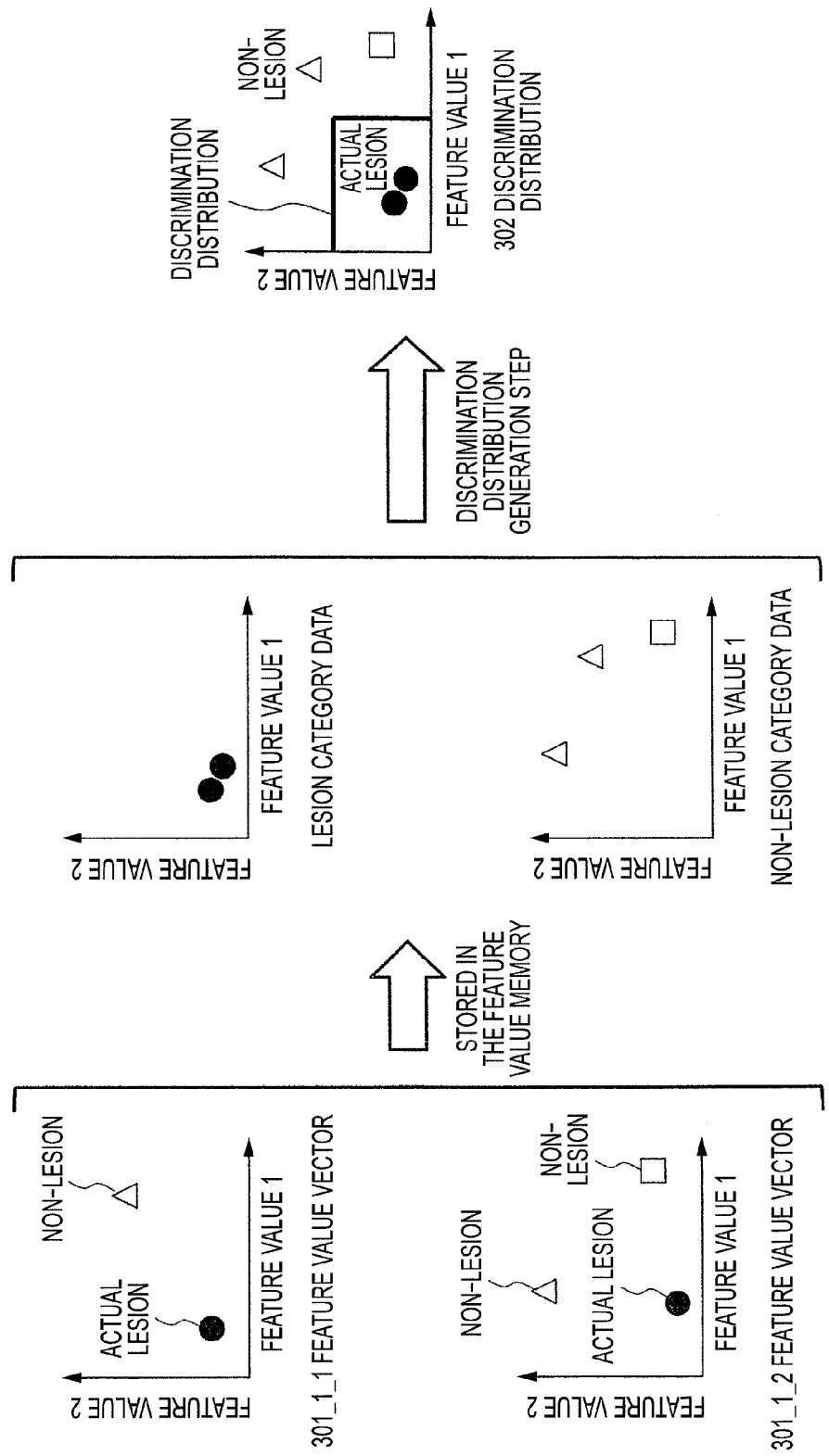
FIG. 4 is a diagram illustrating steps of storing feature values in feature value memory and generating a discrimination distribution according to one aspect of the present invention.

In FIG. 4, which is a flow diagram continued from FIG. 3, the feature value vectors 301_1_1 and 301_1_2 are the same one. As shown in FIG. 4, the feature value vector 301_1_1 and the feature value vector 301_1_2 are stored in the feature value memory 212. As shown in FIG. 4, the discrimination distribution generation step 302 is carried out on the feature value vector stored in the feature value memory 212 to generate the discrimination distribution 302 finally.

In the feature value memory 212, the feature value vector (the first feature information) and its classification information indicating the category, in which the feature value vector is classified, is stored in the form of, for example, table. It should be noted that these information may not be always represented by a data structure in the form of table and may be represented by a data structure in the form of list, database (DB), queue, or the like.

Next, the discrimination distribution generation function 102 will be described in detail.

As shown in FIG. 1, to generate a high-accuracy discrimination distribution even with a small volume of supervised-learning data is available, the discrimination distribution generation function 102 has a weakly descriptive model generation unit 211 and a statistical processing unit 208.

The weakly descriptive model generation unit 211 has a sampling unit 210 and a machine-learning unit 209. The sampling unit 210 acquires a plurality of samples by making sampling of the supervised-learning data (the feature value vector) 303 stored in the feature value memory 212. In this case, sampling is randomly carried out from the feature values vector stored in the feature value memory 212. The number of samples is determined depending on the type of a lesion to be diagnosed and the number of statistical parameters of the feature value vector stored in the feature value memory 212. The sampling unit 210 inputs the acquired plurality of samples in the machine-learning unit 209.

The machine-learning unit 209 carries out the machine-learning processing step on the input plurality of samples to generate the weak discriminator (the first discrimination condition) corresponding to each of these samples. According to the first embodiment of the present invention, the same number of weak discriminators will be generated as the number of the samples. The term "weak discriminator" as used in herein means one assumption, which is one of elements of the discrimination distribution 302. To generate a weak discriminator by the machine-leaning technique, any of learning algorithms exemplified by nearest neighbor algorithm, linear descriptive algorithm, neural network, Bayes decision rule, AdaBoost (Adaptive Boosting), and support vector machine may be used.

The statistical processing unit 208 carries out the statistical step on a plurality of weak discriminators generated in the machine-learning unit 209 to generate the discrimination distribution (the second discrimination condition) 302. The statistical processing step 422 is exemplified by majority logic. The statistical processing step may be carried out using any of other methods including the use of weighted majority logic, and the use of square error and minimum description length (MDL), and the selection based on Akaike's information criterion (AIC) or Bayesian information criterion (BIC). The discrimination distribution 302, which is a discriminator finally obtained from the plurality of weak discriminators in the statistical step, is used to determine whether the feature value vector 301_1_1 of the lesion candidate mask 300_1_1 is an actual lesion.

Figure 5:
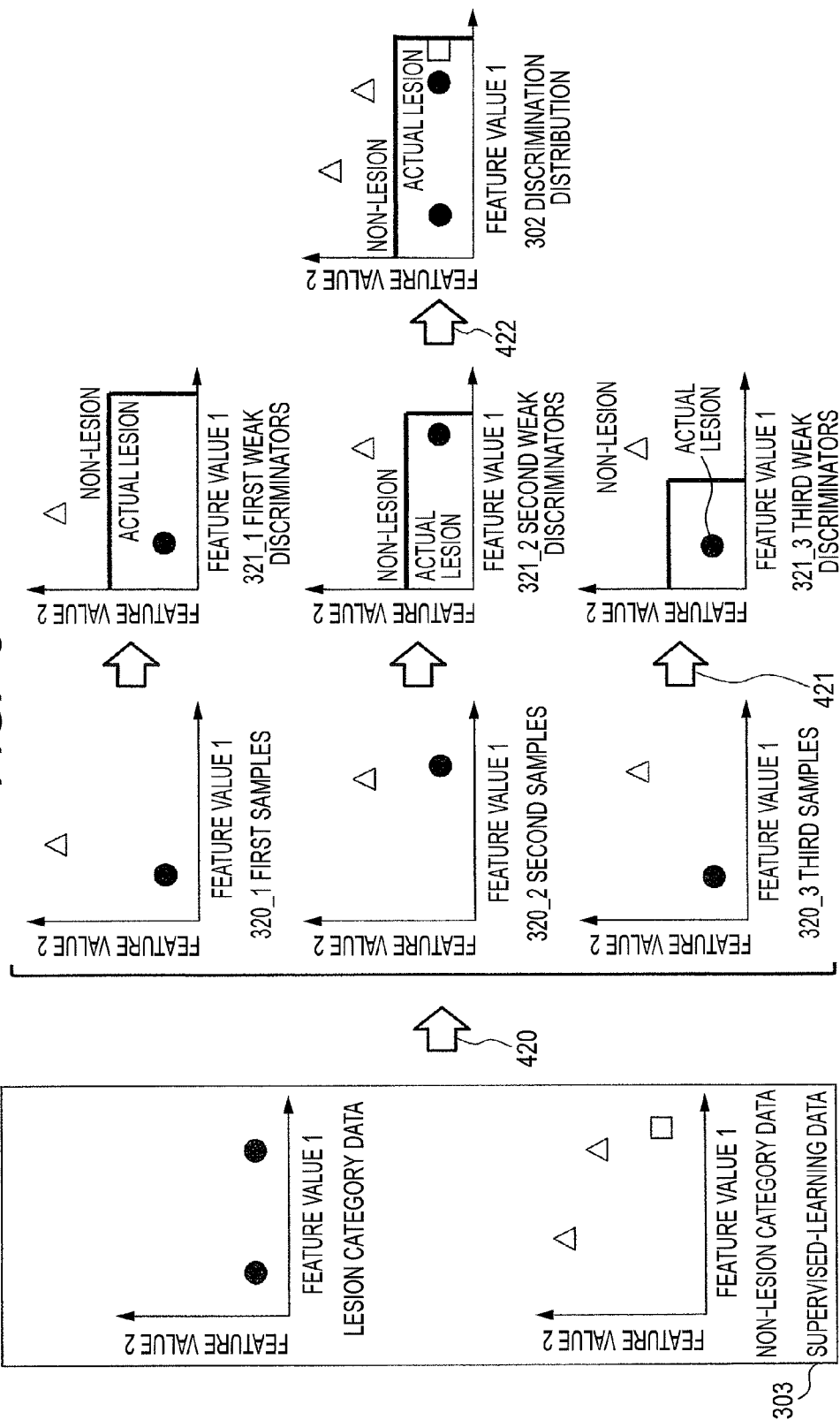
FIG. 5 is a flow diagram illustrating a step of performing a discrimination function according to one aspect of the present invention.

FIG. 5 is a flow diagram illustrating a step for performing the discrimination distribution function 102.

A sampling step 420 is carried out in the sampling unit 210 and a machine-learning processing step 421 is carried out in the machine-learning unit 209. A statistical processing step 422 is carried out in the statistical processing unit 208.

As shown in 5, first, the sampling step 420 is carried out on the supervised-learning data (the feature value vector) 303 stored in the feature value memory 212 to generate a plurality of samples. In this case, three samples, a first sample 320_1, a second sample 320_2, and a third sample 320_3, are acquired. Two feature value vectors are acquired for each sample in FIG. 5, which schematically illustrates a step of acquiring samples for easy understanding of the present invention; thereby, the number of the feature value vectors extracted for each sample is not limited to two.

Then, the machine-learning processing step 421 is carried out on three samples to generate a plurality of weak discriminators. In this case, a first weak discriminator 3211 corresponding to the first sample 320_1, a second weak discriminator 321_2 corresponding to the second sample 320_2, a third weak discriminator 321_3 corresponding to the third sample 320_3, are generated, respectively. According to the first embodiment of the present invention, a region, which may be determined to be an actual lesion in a 2-dimensional area defined by the feature value 1 and the feature value 2 as an axis, is determined to be a weak discriminator.

Finally, the statistical processing step 422 is carried out on the three discriminators, 321_1, 321_2, and 321_3 to generate the discrimination distribution 302. This step enables high-accuracy discrimination distribution 302 to be stably generated even with only a small volume of information (supervised-learning data) stored in the feature value memory 212. As aforementioned, the discrimination distribution 302 generated in the discrimination distribution generation function 102 is input in the determination unit 205 of the detection function 100.

Second Embodiment

Hereinafter, another embodiment of the present invention will be described. FIG. 6 is a block diagram of the system for medical diagnostic imaging assistance according to a second embodiment of the present invention. The same referential numerals as those in FIG. 1 are used for the same functional elements in FIG. 6.

The system for medical diagnostic imaging assistance according to the second embodiment of the present invention has been designed so as to carry out the sampling processing step in the first embodiment of the present invention based on a medical classification or a statistical classification. The discrimination distribution generation function 102 has a sampling unit 220 for carrying out the sampling step based on classification information in substitution for the sampling unit 210 according to the first embodiment of the present invention.

The classification information indicating the category, in which the feature value vector stored in the feature value memory 212 is classified, has been added to the feature value vector. The sampling unit 220 carries out a sampling step using the classification information 304 stored in the feature value memory 212.

The term "classification information 304" as used herein means information indicating the category, in which a feature value vector is classified. To take an example of the classification information 304, the lesion categories for medical classification include metaphysical classification by lesion, such as simple nodule, peri-simple-nodular proliferation, ambiguous small nodule, and multi-nodular adhesion. The non-lesion categories for medical classification include site classification such as blood vessels including a vein and portal vein, aneurysm, cyst, and treatment cicatrix. For statistical classification, tumor likelihood, namely a detection result, which is fed back in response to the addition of a feature value or supervised-learning data, may be used. However, the classification is not limited to these categories.

FIG. 7 is a flow diagram illustrating a step for performing the discrimination distribution generation function 102 according to the second embodiment of the present invention. The same referential numerals as those in FIG. 5 are used for the same functional elements in FIG. 7 to avoid redundant description. A sampling step 430 is carried out in the sampling unit 220.

In FIG. 7, a lesion 500 (the feature value vector for lesion 500) has classification information indicating a lesion category 510, in which it is classified. In this case, the classification information is weighted. In a sampling step 430, sampling is made on the feature value vector based on the weight added to a lesion category 1 (510), a non-lesion category 1 (511), and a non-lesion category 2 (512).

The number of samples acquired for each category is determined depending on its weight. Giving an example, to detect a lesion classified in the lesion category 1, the weight for the lesion category 1 may be increased. In this case, the number of samples detected from the lesion category 1 is increased; thereby, the detection rate of the lesion classified in the lesion category 1 may be set to a higher value.

On the other hand, to decrease the rate of false detection, in which an actual lesion is erroneously determined to be a non-lesion, the weight for a category (herein, the non-lesion category 2) having a similar feature to that of the actual lesion may be set to a higher value. In this case, the number of the samples from the non-lesion category 2 is preferentially increased. As known from an example shown in FIG. 7, a large number of samples of a non-lesion classified in the non-lesion category 2 having a similar feature value to that of an actual lesion 500 are acquired compared with the non-lesion category having an evidently different feature value from that of the actual lesion. This enables the accuracy of the discrimination condition of the border (undefined region) between the actual lesion and the non-lesion to be set to a higher value. The examples of the non-lesion category 1 include a vein and portal vein. The examples of the non-lesion category 2 include aneurysm and cyst.

The weight may be set in various ways as described below. Giving an example, when the lesion category to be detected has been previously set in the system, the weight may have also been previously set.

Alternatively, the interface unit 202 may be designed so as to view a screen allowing a diagnostician to specify the weight if necessary.

Alternatively, to save labor required to specify the weight for each category, the weight may be automatically set to a higher value for the lesion category to be detected when a diagnostician specifies the lesion category. Alternatively, the interface unit 202 is designed so as to view more than one mode, for example, a mode, in which the detection rate of the lesion is elevated and a mode, in which the rate of false detection (a lesion is erroneously determined to be a non-lesion) is decreased, allowing a diagnostician to easily select his/her desired mode. In this case, the weight for the lesion to be detected and the weight for the non-lesion category 2 are automatically set depending on the specified mode.

Alternatively, apart from the aforementioned examples, in which the feature value vector 301_2 is sampled from the feature value memory 212 depending on the weight for each of the categories, the weight for each of the categories may be used for another step. Giving an example, the weight for each of the categories may be used in the statistical processing step in the statistical processing unit 208, or the majority logic may be applied depending on the weight.

Third Embodiment

Hereinafter, a further embodiment of the present invention will be described. FIG. 8 is a block diagram of the system for medical diagnostic imaging assistance according to the third embodiment of the present invention. The same referential numerals as those in FIG. 1 are used for the same functional elements in FIG. 8. FIG. 9 shows a screen viewing an image given to a diagnostician through the interface unit 202 in a representation step 901 and in a manual operation step by the diagnostician.

The interface unit 202 has a monitor (output device), and input devices such as a mouse and a keyboard. On the monitor screen of the interface unit 202, a medical image viewing field 600 and a detection result viewing field 602 are viewed.

The medical image viewing field 600 contains a detection result image 601. On the detection result image 601, the individual lesion candidate masks 300_1 are viewed by means of different patterns, allowing a diagnostician to easily discriminate among them.

In the detection result viewing field 602, the detection result 310 is viewed by means of listing. The detection result viewing field 602 contains patterns allowing the lesion candidate masks 300_1 to be easily discriminated, a lesion feature value viewing field 610, a category data viewing field 611, and a category data input field 612.

The lesion feature value viewing field 610 contains lesion likelihood scores. The term "lesion likelihood score" as used herein means information on the discrimination distribution 302 corresponding to each of lesion candidate masks 300_1. In the third embodiment of the present invention, the majority logic has been used in the statistical processing step for generating the discrimination distribution 302. In this case, it is viewed as a lesion-likelihood score whether the feature value vector for each of lesion candidate masks 300_1 meets the conditions set in some or all of the weak discriminators. Namely, with a higher lesion-likelihood score, the feature value vector meets the conditions set in a larger number of discriminators, achieving the higher-accuracy determination result in the category data viewing field 611. Thus, in the detection result viewing field 602, the detection result data is viewed in the descending order of likelihood in the lesion feature value viewing field 610. However, the detection result data may be viewed by means of any other information not limited to likelihood score. Giving an example, the lesion-likelihood scores may be converted into several-levels of ranking information for viewing.

In the category data viewing field 611, the category determined in the determination unit 205 is viewed. In the category data viewing field 611 shown in FIG. 9, any of category information such as lesion category 1 (259), lesion category 2 (251), non-lesion category 1 (260), and non-lesion category 2 (261) stored in the feature value memory 212 is viewed.

In the category data input field 612, a diagnostician is allowed to specify the category information (diagnostic result) for the lesion candidate mask 300_1. The diagnostician may enter the category information in the category data input field 612 to modify the detection result 310 if the detection result in the category data viewing field 611 and the diagnostic result by the diagnostician do not match. The diagnostician presses a registration button 620 after the whole diagnostic process have been completed.

The interface unit 202 sends the diagnostic result 311 modified by the diagnostician to the feature value memory 212. At that time, the feature value extraction unit 204 sends the extracted feature value vector 301_1 to the feature value memory 212. Accordingly, the extracted feature value vector 301_1 and the diagnostic result 311 are stored in the feature value memory 212.

Thus, feeding back of the diagnostic result by the diagnostician to the feature value memory 212 allows post-diagnostic correct category information to be stored in the feature value memory 212. This may improve gradually the accuracy of the discrimination distribution 302 generated by the discrimination distribution generation function 102.

SUMMARY

According to the first embodiment of the present invention, first, the sampling unit 210 acquires a plurality of samples by making sampling on the supervised-learning data (feature value vector) 303 stored in the feature value memory 212. Then, the machine-learning unit 209 carries out the machine-learning processing step on the multiple samples to generate the weak discriminator corresponding to each of the samples. Next, the statistical processing unit 208 carries out the statistical processing step on the plurality of weak discriminators generated in the machine-learning unit 209 to generate the discrimination distribution 302. Finally, the determination unit 205 refers to the feature value vector 301_1 for the lesion candidate mask 300_1 based on the discrimination distribution 302 to determine whether each of the feature value vectors is an actual lesion. According to the first embodiment of the present invention, a plurality of different samples may be acquired even with only a small volume of supervised-learning data stored in the feature value memory 212 to generate a final discrimination condition (discrimination distribution 302) using them. Thus, even with only a small volume of supervised-learning data available, the high-accuracy discrimination condition (discrimination distribution 301) may be finally generated, improving the accuracy of lesion determination.

According to the second embodiment of the present invention, category information indicating the category (medical or statistical), in which a feature value vector is classified, has been added to the feature value vector 301_2 stored in the feature value memory 212. The sampling unit 220 carries out a sampling step on the feature value vector 301_2 using the category information 304 stored in the feature value memory 212. According to the second embodiment of the present invention, for medical classification, sampling is carried out preferentially on the feature value vector 301_2 for the non-lesion category having the feature similar to the lesion category or diseased tissue category to improve the determination accuracy. For statistical classification, a sampling step may be carried out on the feature value vector, for which an actual lesion may be definitely determined, and the feature value vector, for which it may not be definitely determined easily, using any of well-balanced techniques including the tumor-likelihood data fed back to improve the determination accuracy.

According to the second embodiment of the present invention, the category information is weighted and the sampling unit 202 makes determination based on the weight. According to the second embodiment of the present invention, the well-balanced number of samples acquired may be set for each category by a well-balance technique to improve the determination accuracy.

According to the third embodiment of the present invention, the detection result viewing field 602 on a screen viewed through the interface unit 202 contains the lesion feature value viewing field 610 and the category data viewing field 611. The lesion feature value viewing field 610 contains the lesion likelihood scores. According to the third embodiment of the present invention, a diagnostician is allowed to make diagnosis taking into account the accuracy of the result viewed in the category data viewing field 611. Moreover, the detection results may be viewed in the detection result viewing field 602 in the descending order of likelihood scores in the lesion feature value viewing field 610, allowing a diagnostician to visually check the determination results in the descending order of potentials for actual lesion.

Furthermore, according to the third embodiment of the present invention, the detection result viewing field 602 contains the category data viewing field 611 and the category data input field 612 contains the input field allowing a diagnostician to specify the category information (diagnostic result) for the lesion candidate mask 300_1. The interface unit 202 sends the diagnostic result 311 modified by the diagnostician to the feature value memory 212. At that time, the feature value extraction unit 204 sends the extracted feature value vector 301_1 to the feature value memory 212. As a result, the extracted feature value vector 3011 and the diagnostic result 311 are stored in the feature value memory 212. The prior art has a problem that only an insufficient volume of supervised-learning data of medical images is available. In contrary, according to the third embodiment of the present invention, even with only an insufficient volume of supervised-learning data available, the diagnostic results by a diagnostician are accumulated in the feature value memory 212, achieving a gradual increase in supervised-learning data. Furthermore, feeding back of the diagnostic result by a diagnostician to the feature value memory 211 allows the pre-diagnostic correct category information to be stored in the feature value memory 212 to improve the subsequent determination accuracy.

It should be noted that the present invention includes but not limited to the aforementioned embodiments, and any other various modes may be included. Giving an example, some of the aforementioned embodiments are described in detail for easy understanding of the present invention and the present invention is not always limited to the embodiments with composition of all the elements described herein. Moreover, it is possible that any other element (s) is added to; a partial element is removed from; and a partial element is substituted for a partial element of; the composition of each of the embodiments. Giving an example, according to the aforementioned embodiments, the learning function 101 has the lesion mask detection unit 206 and the learning feature value extraction unit 207; however, even without these elements, incorporating the feature value memory 212 previously containing the feature value vector may implement the present invention.

Part or all of the compositions, functions, processing units, processing steps, etc. as aforementioned may be implemented by means of hardware, for example, designing using integrated circuits. Alternatively, the present invention may be implemented by a software program code capable of executing the functions in the embodiments. In this case, a storage medium containing a program code is mounted on a computer and then the computer (or a CPU or MPU) reads out the program code contained in the storage medium. Specifically, the program code readout from the storage medium implements the functions in the embodiments as aforementioned; thereby, the program code and the storage medium containing the code may be assumed to be elements of the present invention.

The storage media for containing this program code include a flexible disk, CD-ROM, DVD-ROM, hard disk, Storage State Drive (SSD), optical memory disk, CD-R, magnetic tape, non-volatile memory card, and ROM.

The program code for implementing the functions in the embodiments described herein may be written in any of a wide range of programming or script languages, such as assembler, C/C++, perl, Shell, PHP, Java (registered trademark) and the like.

Furthermore, the software program code for implementing the functions in the embodiments described herein may be acquired via a network and stored in any of memory such as computer hard disk, CD-RW, and CD-R so that the computer (or a CPU or MPU) reads out the program code stored in the memory or the storage medium if necessary for execution.

In the aforementioned embodiments, only control lines and information lines though to be necessary for explanation are shown and all the control lines and information lines are not always shown. All the elements may be interconnected.

What is claimed is:

1. An apparatus for medical diagnostic imaging assistance with a detection function for automatically detecting a lesion on a target case image, comprising:
    memory that stores first feature information representing a feature of a lesion mask or a non-lesion mask as first learning data per mask;
    a sampling unit that samples more than one of said first learning data, and generates a plurality of different subsets of learning data;
    a machine-learning unit that generates a first discrimination condition corresponding to each of the plurality of different subsets by carrying out a machine-learning process on the plurality of different subsets; and
    a statistical processing unit that carries out a statistical processing step under the first discrimination condition to generate a second discrimination condition,
    wherein category information indicating a category used for medical or statistical classification is added to the first learning data stored in the memory,
    wherein the sampling unit samples the first learning data and generates the plurality of different subsets of learning data based on the category information, and
    wherein a number of samples of the first learning data sampled by the sampling unit is determined based on the category information.

2. The apparatus for medical diagnostic imaging assistance according to claim 1,
    wherein the sampling unit adds a weight to the category information and determines the number of samples for each piece of the category information.

3. The apparatus for medical diagnostic imaging assistance according to claim 1, further comprising:
    a first detection unit that detects a first mask related to a lesion candidate mask or the non-lesion mask on a learning image;
    a first extraction unit that extracts first feature information representing a feature of the lesion candidate mask;
    a second detection unit that detects the lesion candidate mask related to the lesion or a non-lesion on a target image;
    a second extraction unit that extracts second feature information of the lesion candidate mask; and
    a determination unit that determines whether the lesion candidate mask is a lesion or non-lesion by referring to the second feature information under the second discrimination condition;
    wherein the extracted feature information or second extracted feature information is stored as said first learning data per mask in the memory.

4. The apparatus for medical diagnostic imaging assistance according to claim 3, further comprising:
    a first interface for displaying a determination result by the second detection unit to a diagnostician,
    wherein the first interface displays:
        an image of the lesion candidate mask, a determination result corresponding to the lesion candidate mask, and information on the second discrimination condition corresponding to the lesion candidate mask.

5. The apparatus for medical diagnostic imaging assistance according to claim 4, further comprising:

a second interface allowing a diagnostician to modify the determination result of lesion or non-lesion to said lesion candidate mask by the second detection unit, wherein, when the determination result is modified by the diagnostician, the second interface sends the modified determination result to the memory, and wherein the modified determination result is added as supervised-learning data of the second feature information and the lesion candidate mask is stored as the first learning data in the memory.

6. A method for medical diagnostic imaging assistance for automatically detecting a lesion on a target case image using an apparatus for medical diagnostic imaging assistance, the apparatus including a sampling unit, a machine-learning unit, a statistical processing unit, a first detection unit, a first extraction unit, and a determination unit, the method comprising:

sampling, based on a first sampling information, from a memory storing first feature information representing the feature of a lesion mask or a non-lesion mask as first learning data per mask to acquire a plurality of samples of more than one of the first learning data, and generating a plurality of different subsets of learning data;

generating a first discrimination condition corresponding to each of the plurality of different subsets by carrying out a machine-learning processing step on the plurality of different subsets in the machine-learning unit;

generating a second discrimination condition by carrying out a statistical processing step under the first distribution condition in the statistical processing unit;

wherein category information indicating a category used for medical or statistical classification is added to the first learning data stored in the memory, wherein the first learning data are sampled and the plurality of different subsets of learning data are generated based on the category information, and wherein a number of samples of the first learning data is determined based on the category information.

7. A non-transitory computer readable medium storing a program for allowing a computer to execute an automatic detection process for detecting a lesion on a target case image, the process comprising:

acquiring a plurality of samples by sampling from a memory storing first feature information representing a lesion mask or a non-lesion mask;

generating a first discrimination condition corresponding to each of the samples by carrying out a machine-learning processing step on the plurality of samples;

generating a second discrimination condition by carrying out a statistical processing step under the first discrimination condition;

wherein category information indicating a category used for medical or statistical classification is added to first learning data stored in the memory, wherein the first learning data are sampled and a plurality of different subsets of learning data are generated based on the category information, and wherein a number of samples of the first learning data is determined based on the category information.

* * * * *